United States Patent
Piombini et al.

(10) Patent No.: US 9,375,805 B2
(45) Date of Patent: Jun. 28, 2016

(54) METHOD FOR THE MICRODEFORMATION OF THE FRONT FACE OF A THIN PART BY MODIFYING THE REAR FACE OR THE PERIPHERY OF THE PART

(75) Inventors: Herve Piombini, Esvres/Indre (FR); David Damiani, Veigne (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 4 days.

(21) Appl. No.: 13/501,694

(22) PCT Filed: Oct. 11, 2010

(86) PCT No.: PCT/EP2010/065164
§ 371 (c)(1),
(2), (4) Date: Apr. 12, 2012

(87) PCT Pub. No.: WO2011/045260
PCT Pub. Date: Apr. 21, 2011

(65) Prior Publication Data
US 2012/0201957 A1    Aug. 9, 2012

(30) Foreign Application Priority Data

Oct. 12, 2009   (FR) .................................. 09 57112

(51) Int. Cl.
*B05D 5/06*    (2006.01)
*B23K 26/00*   (2014.01)
(Continued)

(52) U.S. Cl.
CPC ............. *B23K 26/00* (2013.01); *B23K 26/0006* (2013.01); *B23K 26/0009* (2013.01);
(Continued)

(58) Field of Classification Search
CPC .......... B05D 5/06; C23C 16/04; B29C 59/16; B44C 1/22; B23K 26/00; B23K 26/0045; B23K 26/0036; B23K 26/0009; B23K 26/0051; B23K 26/0066; C03C 23/0005; G02B 27/0025; G02B 1/12; G02B 5/08
USPC .................................................. 427/160–169
See application file for complete search history.

(56) References Cited

U.S. PATENT DOCUMENTS 4,443,493 A * 4/1984 Delfino ............... H01L 21/3105
                                                                219/121.65
7,927,669 B2 * 4/2011 Schlatterbeck et al. ...... 427/510
(Continued)

FOREIGN PATENT DOCUMENTS

JP    63-072497 A    4/1988
JP    06-148411 A    5/1994
(Continued)

OTHER PUBLICATIONS

Gas Pressure—https://web.archive.org/web/20061127214629/http://www.grc.nasa.gov/WWW/K-12/airplane/pressure.html, accessed online Jun. 25, 2015.*
(Continued)

*Primary Examiner* — Michael Wieczorek
*Assistant Examiner* — Michael G Miller
(74) *Attorney, Agent, or Firm* — Nixon Peabody LLP; Khaled Shami

(57) ABSTRACT

Method for the microdeformation of the front face of a thin part, by modifying the rear face or the periphery of the part. According to the invention, which can notably be used to correct the wave surface of a mirror, a local treatment is applied to the rear face or to the periphery which causes a static microdeformation, which is frozen once and for all, of the front face, without applying any mechanical force to the part.

9 Claims, 8 Drawing Sheets

(51) Int. Cl.
  *G02B 1/12* (2006.01)
  *G02B 5/08* (2006.01)
  *G02B 27/00* (2006.01)
  *C03C 23/00* (2006.01)

(52) U.S. Cl.
  CPC ......... *B23K26/0036* (2013.01); *B23K 26/0045* (2013.01); *B23K 26/0051* (2013.01); *B23K 26/0066* (2013.01); *C03C 23/0025* (2013.01); *G02B 1/12* (2013.01); *G02B 5/08* (2013.01); *G02B 27/0025* (2013.01); *B23K 2201/34* (2013.01); *B23K 2203/42* (2015.10); *B23K 2203/50* (2015.10); *B23K 2203/52* (2015.10)

(56) References Cited

U.S. PATENT DOCUMENTS

2003/0081722 A1* 5/2003 Kandaka et al. ................ 378/70
2009/0256286 A1* 10/2009 Lesche ......................... 264/446

FOREIGN PATENT DOCUMENTS

| JP | 2005-012006 A | 1/2005 | |
|----|---------------|--------|---|
| JP | 2007-094112 A | 4/2007 | |
| WO | 2004/036316 A1 | 4/2004 | |
| WO | WO 2004036316 A1 * | 4/2004 | ............... G03F 7/20 |

OTHER PUBLICATIONS

Definition of static—http://www.thefreedictionary.com/static, accessed online Jun. 25, 2015.*

Mathur, Vaibhav et al., "All optically driven MEMS deformable mirrors via direct cascading with wafer bonded GaAs/GaP PIN photodetectors", Optical MEMS and Nanophotonics, 2009 IEEE/LEOS International Conference on, IEEE, Piscataway, NJ, USA (Aug. 17, 2009).

International Search Report, PCT/EP2010/065164, dated Feb. 25, 2011.

French Preliminary Search Report, FR 0957112, dated May 17, 2010.

* cited by examiner

METHOD FOR THE MICRODEFORMATION OF THE FRONT FACE OF A THIN PART BY MODIFYING THE REAR FACE OR THE PERIPHERY OF THE PART

CROSS REFERENCE TO RELATED APPLICATIONS OR PRIORITY CLAIM

This application is a National Phase of PCT/EP2010/065164, filed Oct. 11, 2010, entitled, "METHOD FOR THE MICRO-DEFORMATION OF A FRONT FACE OF A THIN PART BY MEANS OF MODIFYING THE REAR FACE OR THE PERIPHERY OF THE PART", and which claims priority of French Patent Application No. 09 57112, filed Oct. 12, 2009, the contents of which are incorporated herein by reference in their entirety.

TECHNICAL FIELD

The present invention concerns a method of microdeformation of the front face of a thin part.

Such a part is delimited by a first face, called the front face, by a second face, called the rear face, opposite the first face, and by a peripheral portion, called the periphery, which connects the first face to the second face.

It is said to be thin if the largest distance measurable over at least one of the first and second faces is more than approximately five times, and preferably eight times, the distance between the first and second faces.

For example, in the case of a cylindrical part, the thickness of which is denoted E, both faces are disks of diameter denoted D. Such a part is said to be thin if the ratio D/E is greater than approximately 5, and preferably greater than approximately 8.

Thus, in the present invention, parts having an aspect ratio of the order of 5:1 or greater than 5:1, and preferably of the order of 8:1 or greater than 8:1 are considered.

The invention applies notably to the correction of the wave surface of a mirror, whether or not covered with a treatment, which, due to polishing or treatment defects, does not satisfy the shape or flatness specifications required of it.

Other applications are:
fine compensation for the stresses caused by the deposition of thin layers used to modify the spectral responses of the components; these thin layers tend to give the components additional curvature;
minimisation of the edge effect (flap) caused by polishing the components.

The goal then desired can be to minimise the deformation, or to increase this deformation locally.

STATE OF THE PRIOR ART

The flatness of the surface of an optical component of the mirror type can be corrected during the polishing operation, using local alterations.

But when the optical component is treated by hard coatings of the PVD (physical vapour deposition) type or of the CVD (chemical vapour deposition) type, it becomes extremely difficult to correct this component, unless repolishing and retreatment phases are undertaken, which are lengthy and expensive operations.

The actual surface or the wave surface can then be deformed due to residual polishing defects, tensions of the applied layers or heterogeneousnesses in treatment.

Certain corrections can however be made. For example, optical treatments of the rear face are used to counterbalance the modifications relating to the stresses of the layers deposited on the front face. In this case a global spherical correction is obtained.

One possible solution is to correct the front face by applying locally an additional thickness of material using equipment which uses masks and robots.

DESCRIPTION OF THE INVENTION

The aim of the present invention is to remedy the disadvantages of the techniques mentioned above.

More precisely, the object of the present invention is a method of microdeformation of a first face of a thin part, delimited by the first face, by a second face, opposite the first face, and by a peripheral portion which connects the first face to the second face, where the greatest measurable distance over the first face is greater than approximately five times, and preferably eight times, the distance between the first and second faces, the method being characterised in that a local treatment is applied, to the second face or to the peripheral portion, which causes a static microdeformation, which is frozen once and for all, of the first face, without applying any mechanical force to the thin part.

According to a particular embodiment of the invention, the thin part is made from a material chosen from among the amorphous materials (notably glasses), metals, ceramics and plastics, and the microdeformation of the first face is a local alteration of the latter, obtained by applying a local treatment to the second face.

According to a first particular embodiment of the method which is the object of the invention, the microdeformation is obtained by local glazing of the second face or of the peripheral portion of the thin part, accomplished by means of a laser. The wavelength of this laser may be adapted to the material to improve the laser-matter interaction. For example, a $CO_2$ laser emitting at 10.6 µm will be used if the material is silica.

According to a second particular embodiment, the microdeformation is obtained by a local machining of the second face or of the peripheral portion of the thin part.

This local machining may be a local chemical machining, for example accomplished by means of an ink jet machine.

According to other particular embodiments, the local machining is accomplished by means of a device chosen from among lasers, ion cannons and plasma jet devices.

If the local machining is undertaken by means of a laser, before this local machining it is possible, advantageously, to deposit on the second face or on the peripheral portion of the thin part a substance capable of promoting absorption, by the second face or by the peripheral portion, of the radiation emitted by the laser.

According to a third particular embodiment of the method which is the object of the invention, the microdeformation is obtained by local deposition of at least one thin layer on the second face or on the peripheral portion of the thin part.

According to a preferred embodiment of the invention, an inspection of the microdeformation of the first face is also made, to check whether a desired microdeformation has been obtained, and if this is not the case, the local treatment of the second face or of the peripheral portion is recommenced, until the desired microdeformation is obtained.

In this case, given a device capable of applying the local treatment to the second face or to the peripheral portion, it is possible to undertake the inspection by means of a device for determining microdeformation, where this microdeformation determination device is capable of providing a representative signal of the microdeformation determined in this manner, and to control, by means of the signal, the device capable of applying the local treatment, with a view to recommencing the local treatment until the desired microdeformation is obtained.

BRIEF DESCRIPTION OF THE DRAWINGS

The present invention will be better understood on reading the description of example embodiments given below, purely as an indication and in no sense restrictively, making reference to the appended illustrations in which.

DETAILED DESCRIPTION OF PARTICULAR EMBODIMENTS

Figure 1A:
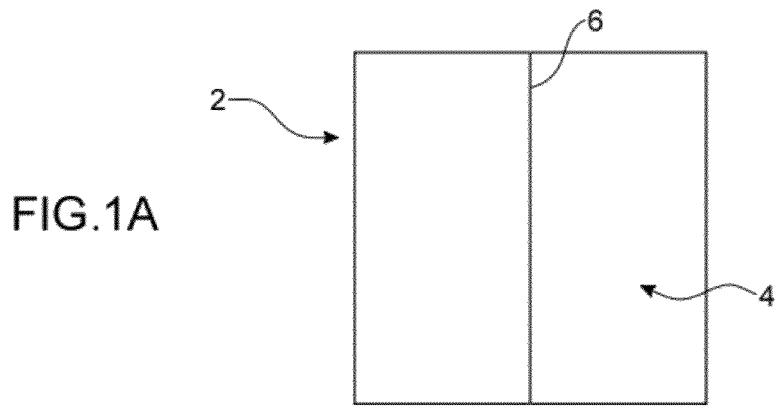
FIGS. 1A to 1E illustrate schematically a first example of the invention.

It should be recalled that the present invention is a method of microdeformation of the front face of a thin part (the aspect ratio of which is preferably equal to approximately 8:1 or more), thanks to a suitable surface treatment, applied to the rear face, or even the periphery, of the part.

If the front face of the part includes a surface layer, it is stipulated that the treatment modifies the tensions of this surface layer.

The invention has a static correction function which, if applicable, enables a part intended for disposal to be recovered, the effect of the stresses of a hard treatment to be corrected, and compensation to be made for the edge effects of a machining or cutting operation. And in certain cases the invention can replace polishing under stress.

In the invention, the correction, or rather a micro-correction, is said to be static. This means that this micro-correction is frozen once and for all; it will not correct surface modifications, relating to thermal variations, for example.

Such a correction contrasts with a dynamic correction, for which the corrections are applied in real time and can change over time.

The originality of the invention lies in the fact that corrections are made to the rear face, by various methods which do not apply any pressure to the part. These methods can, notably, be a laser machining, an ionic machining, a plasma machining, a chemical etching or a local treatment by thin layers.

The corrections can be global, in which case their corrective actions will be felt throughout the part, or point-like, i.e. local, the system used to undertake them being locally addressable.

The feature of the abovementioned methods lies in the fact that they are not developed in the field of polishing, nor in the field of surface treatment.

In addition, the invention enables surface defects to be corrected (usually additional thicknesses, since a trough corresponds to an additional thickness of matter around this trough). Indeed, the treatment applied will be local, and will have a spatial extension, i.e. a width, and an intensity, i.e. a depth, which will depend on the desired correction.

The principle of the invention consists in using the relieving or the creation of stresses to modify the surface of a thin part locally. If local action is taken on the rear face of this part a modification of its front face is observed.

To validate the principle of the invention parts consisting of square substrates of glass were used, the sides of which measure 50 mm, and which are 4 mm in thickness, both faces of which were polished optically, and the front faces of which were measured using an interferometer. The parts were placed in succession in a frame allowing an interferometric measurement over a zone measuring 40 mm×40 mm.

In FIGS. 1A, 2A, 3A and 4A, the parts have the reference 2 (the frame is not represented).

Figure 2A:
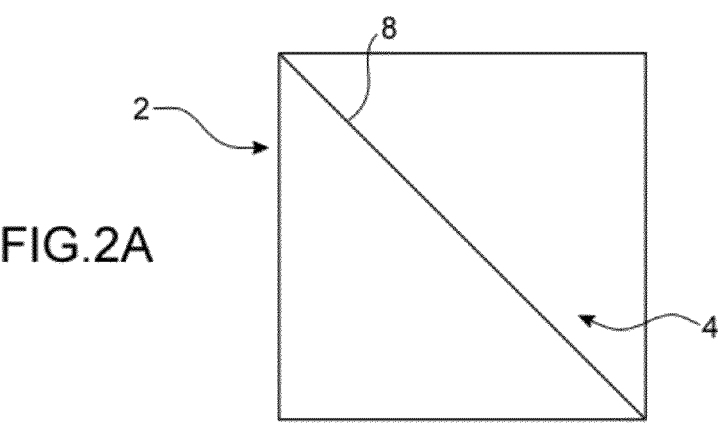
FIGS. 2A to 2E illustrate schematically a second example of the invention.
Figure 3A:
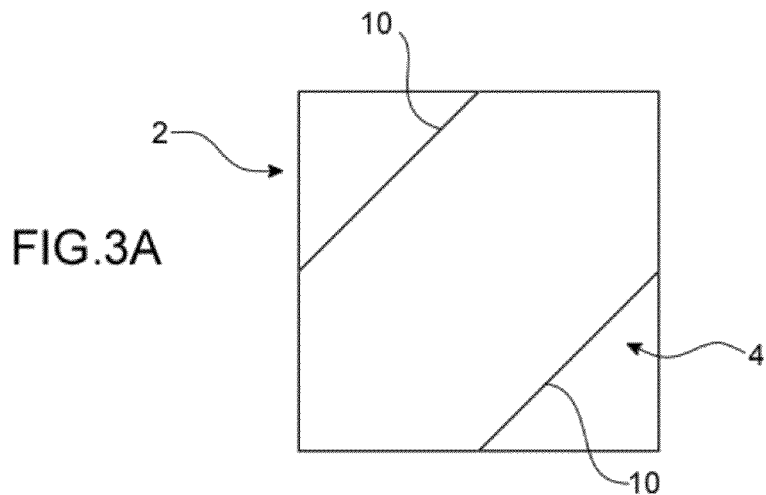
FIGS. 3A to 3E illustrate schematically a third example of the invention.
Figure 4A:
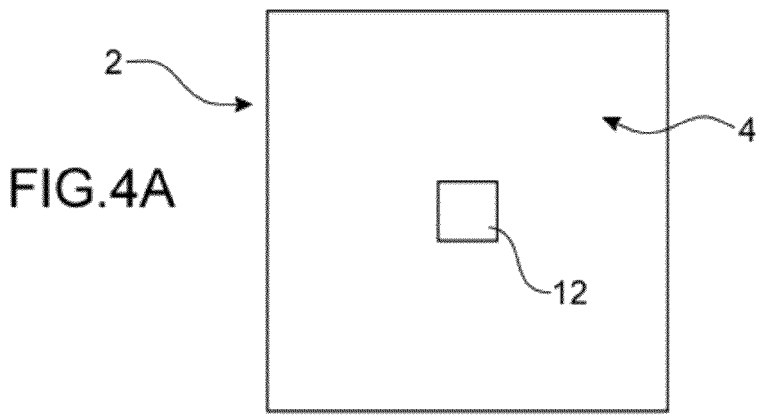
FIGS. 4A to 4E illustrate schematically a fourth example of the invention.

Rear face 4 of the parts or substrates 2 were then machined using a YAG laser operating at its fundamental wavelength (1 ω), with four standard patterns:

substrate of FIG. 1A: a vertical line 6 along a median line,
substrate of FIG. 2A: a line 8 along a diagonal,
substrate of FIG. 3A: two lines 10 inclined at 45° and linking the middles of the sides, and
substrate of FIG. 4A: a square zone 12 measuring approximately 5 mm along each side, positioned approximately in the centre of the substrate.

The front faces of the four substrates were then remeasured, and the measurements obtained after machining were subtracted from the measurements obtained before machining In what follows, PV represents the peak-to-valley separation, and RMS represents the root mean square. And, in the figures, pix represents the number of pixels (along the abscissa and along the ordinate).

Figure 1B:
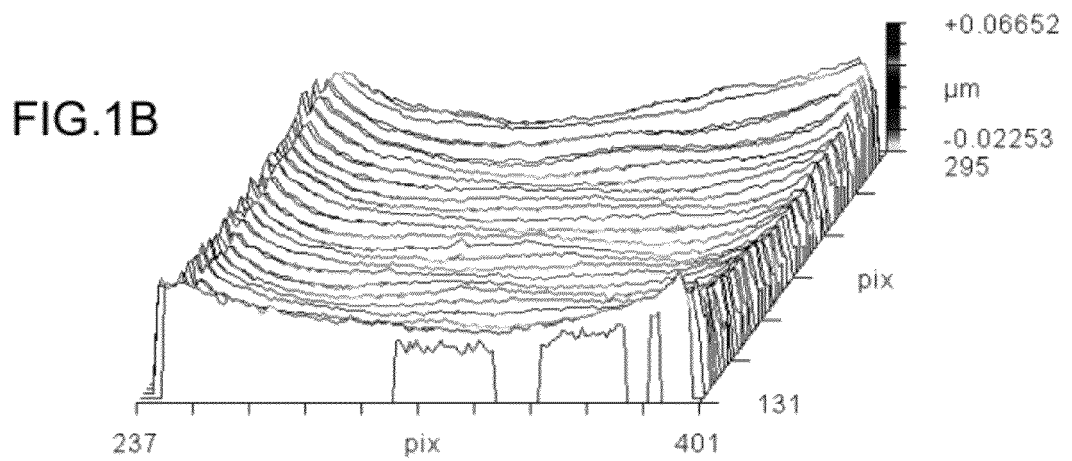
Figure 1C:
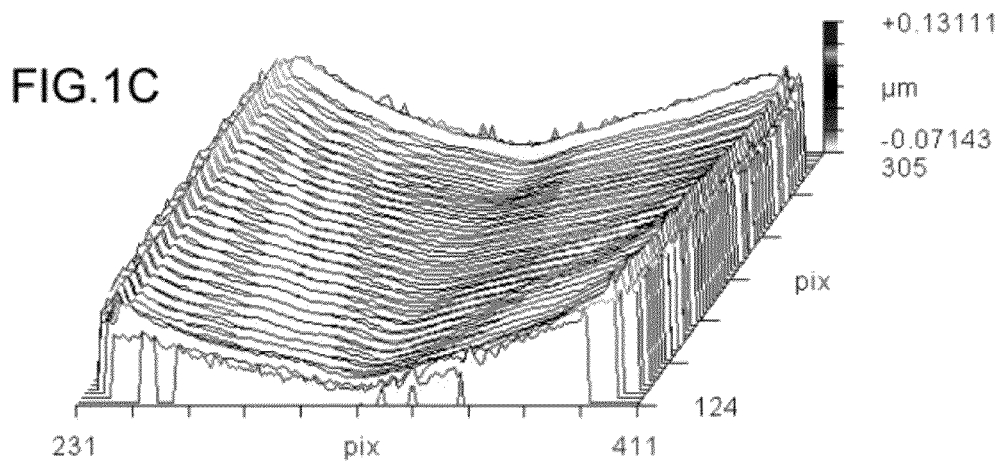
Figure 1D:
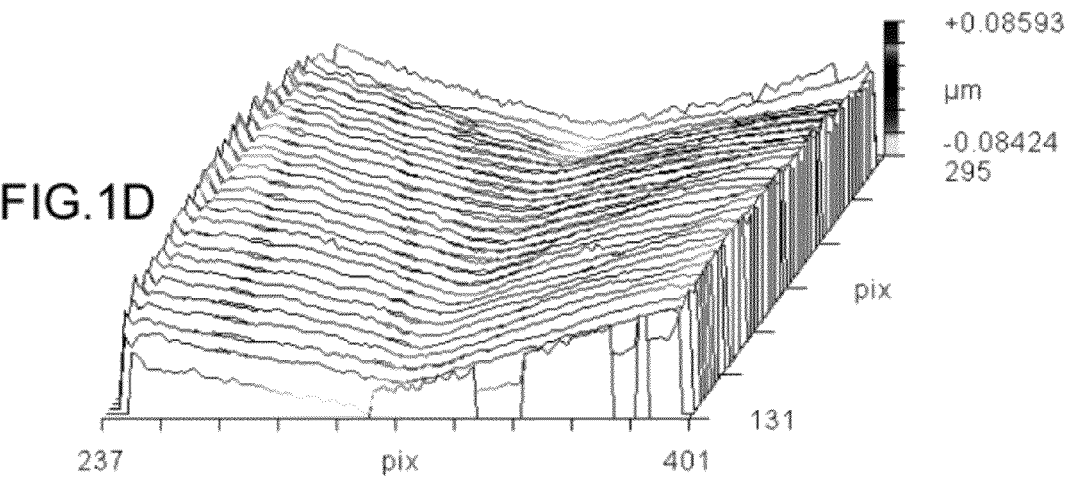
Figure 1E:
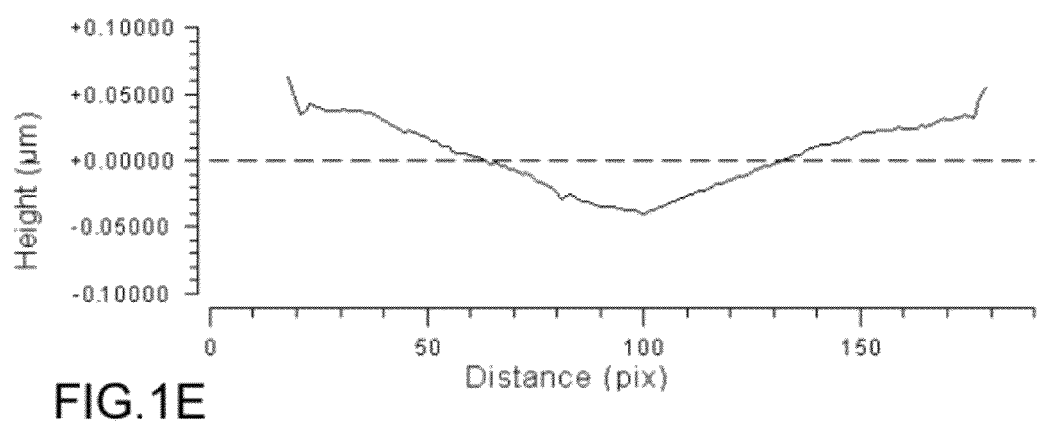

FIG. 1B shows the result of the measurement of the front face of the substrate of FIG. 1A before machining the rear face of this substrate (first measurement); in the case of FIG. 1B, PV is equal to 0.089 µm and RMS is equal to 0.013 µm. FIG. 1C shows the result of the measurement of the front face of the substrate of FIG. 1A after machining the rear face of this substrate (second measurement); in the case of FIG. 1C, PV is equal to 0.203 µm and RMS is equal to 0.039 µm. FIG. 1D shows the modification of the front face, i.e. the first measurement (FIG. 1B) minus the second measurement (FIG. 1C); in the case of FIG. 1D, PV is equal to 0.170 µm and RMS is equal to 0.028 µm. FIG. 1E shows a profile of this modification.

Figure 2B:
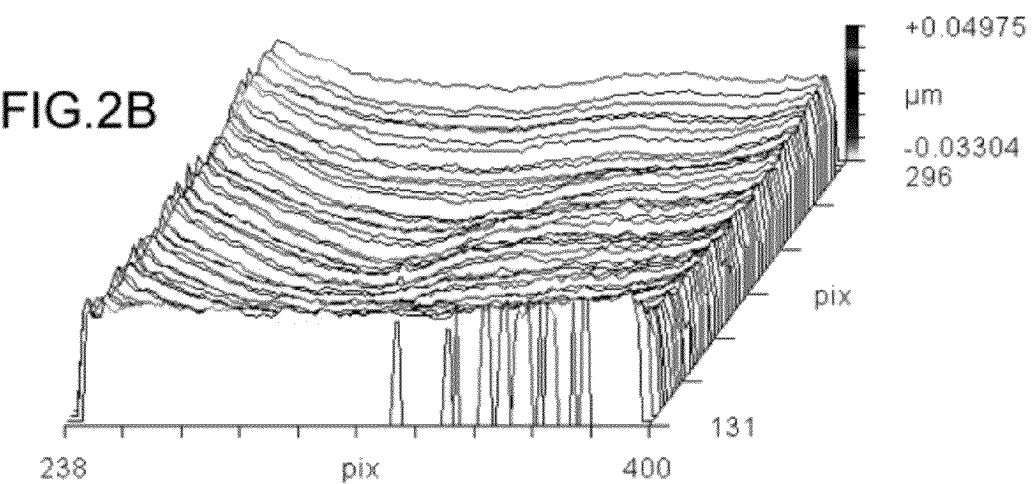
Figure 2C:
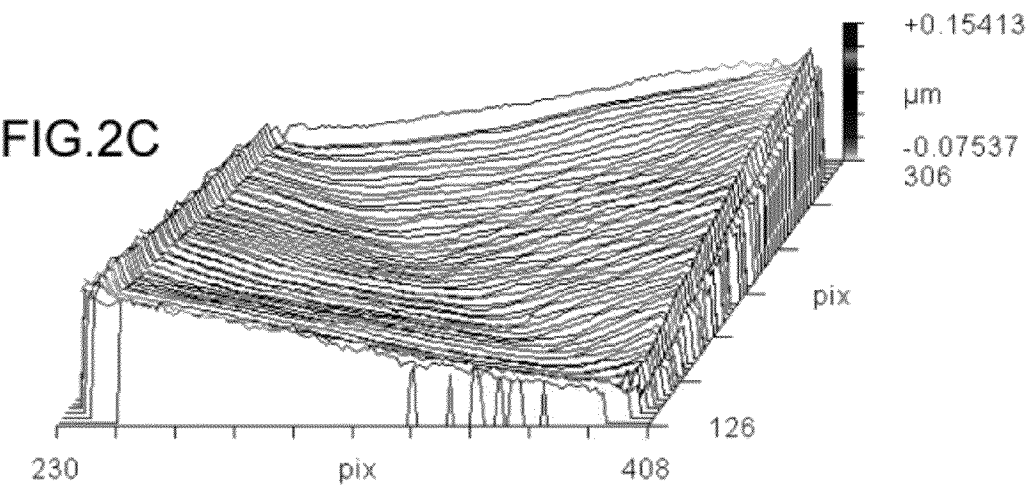
Figure 2D:
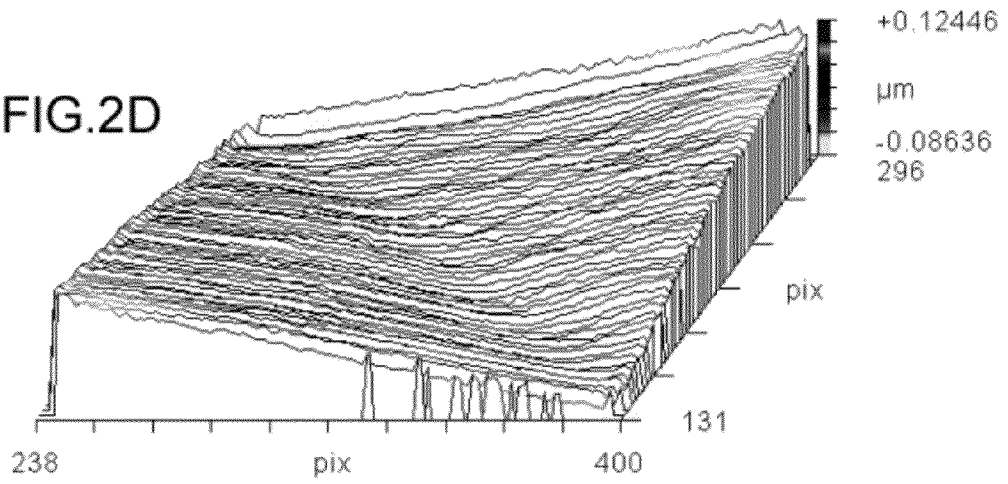
Figure 2E:
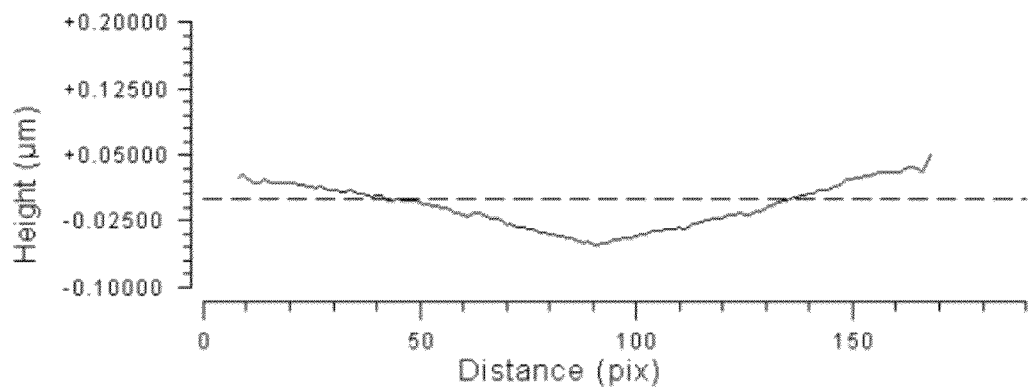
Figure 3B:
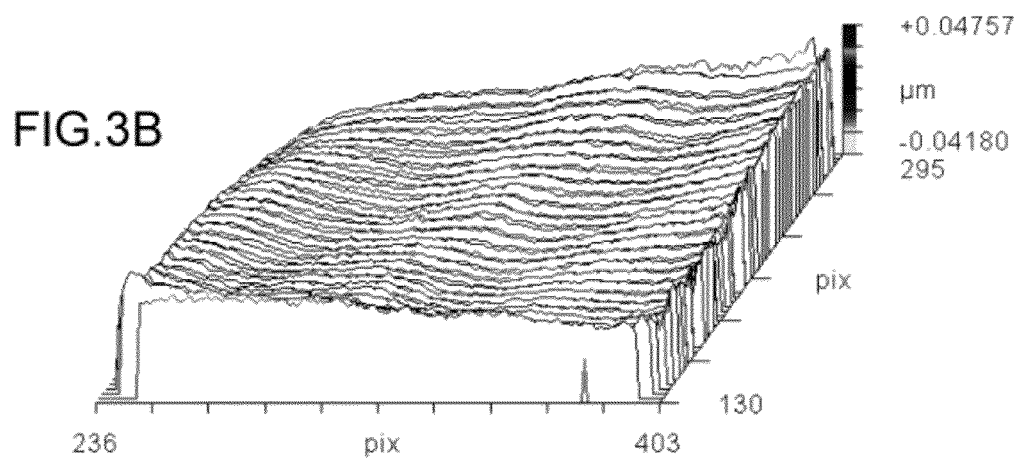
Figure 3C:
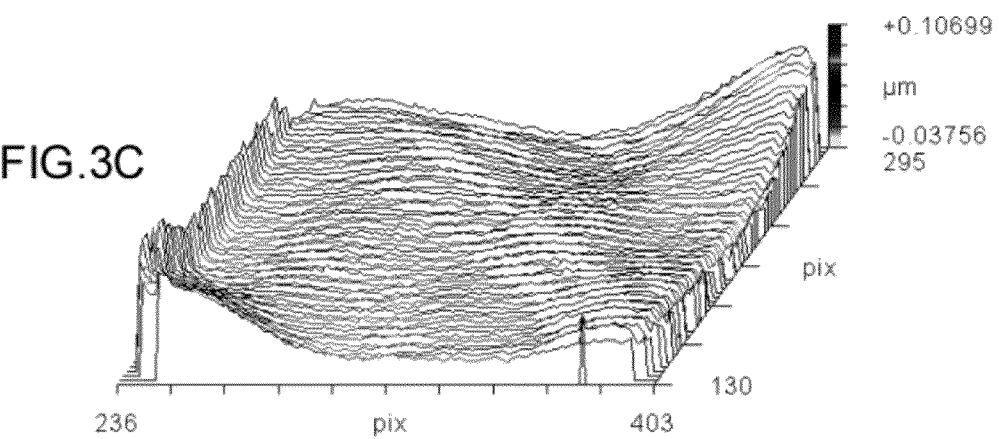
Figure 3D:
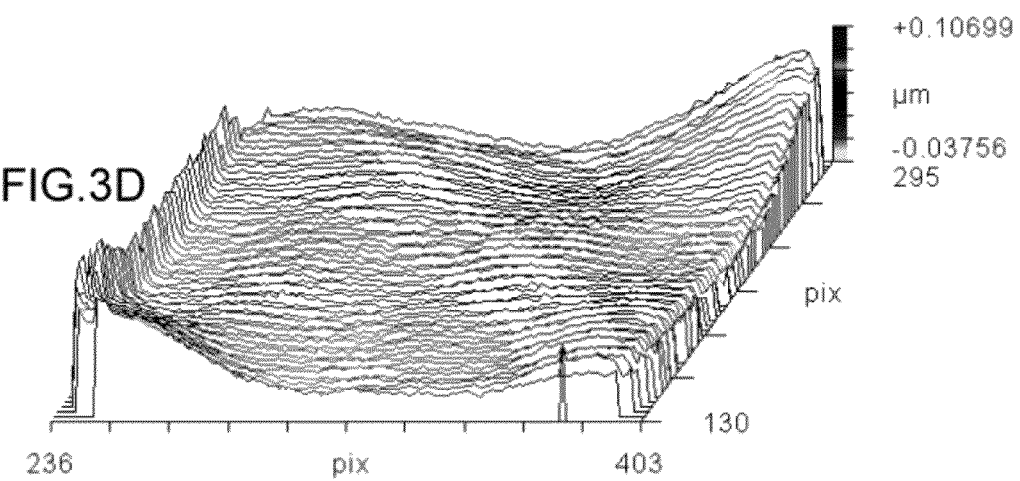
Figure 3E:
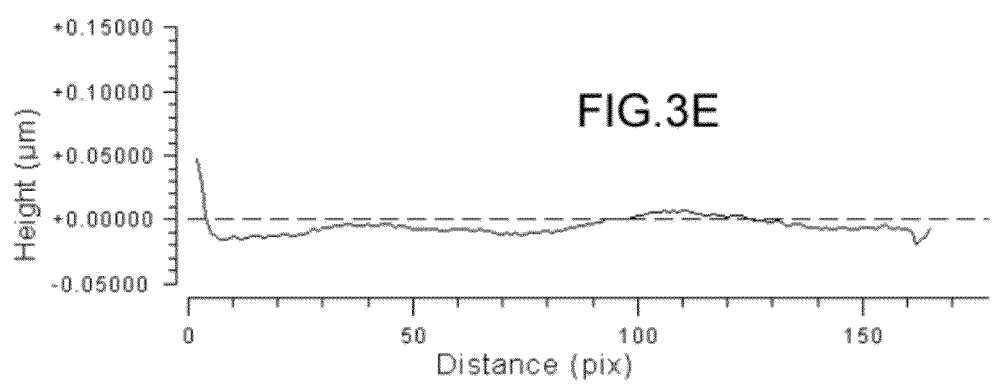
Figure 4B:
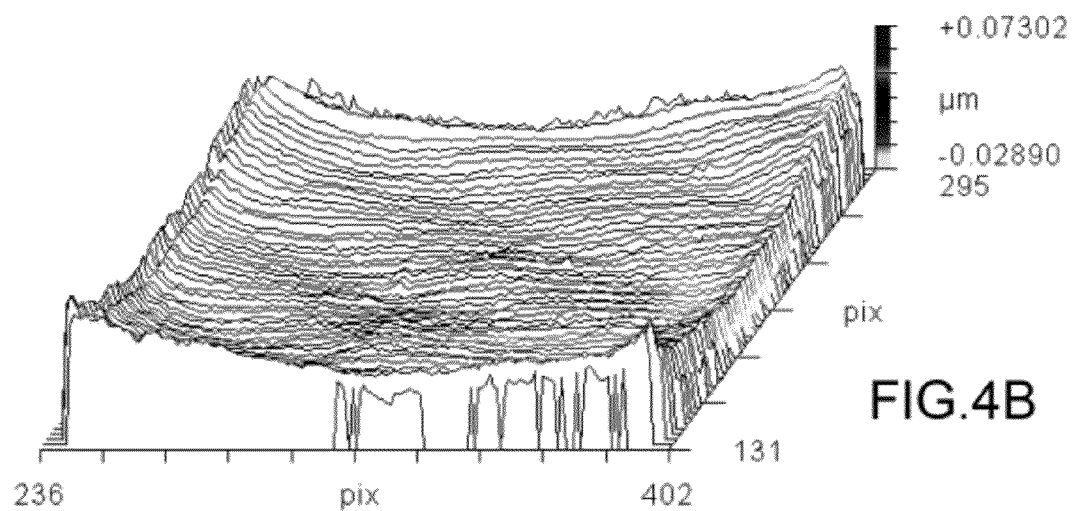
Figure 4C:
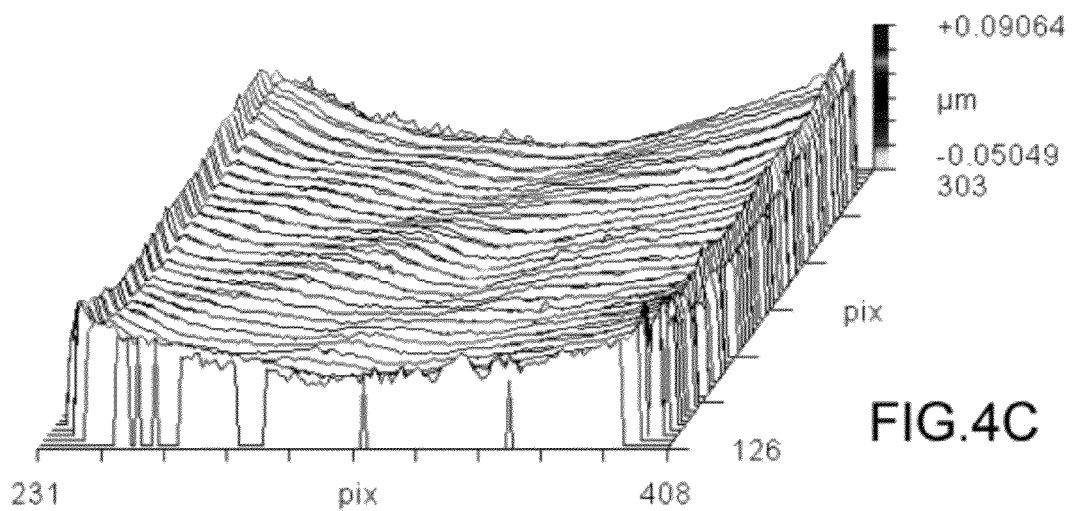
Figure 4D:
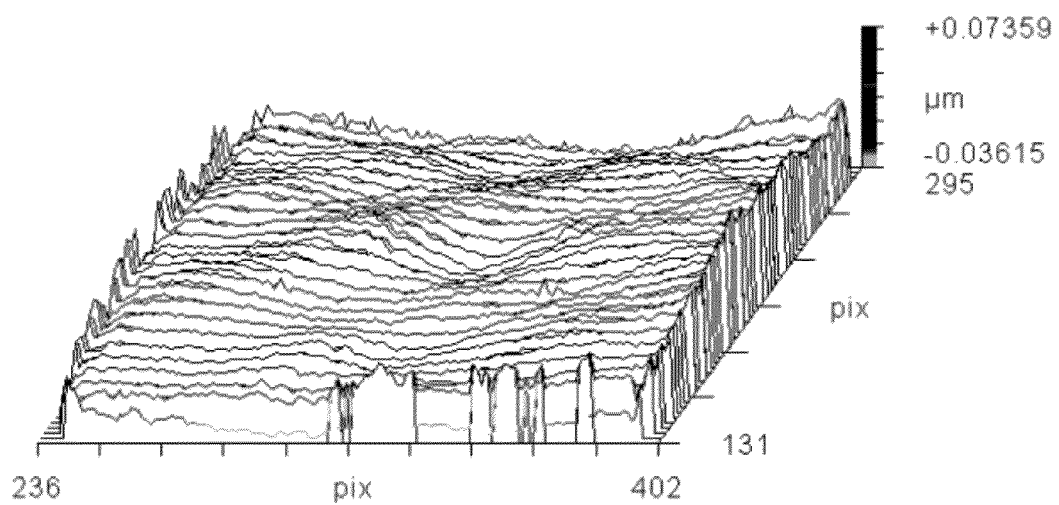
Figure 4E:
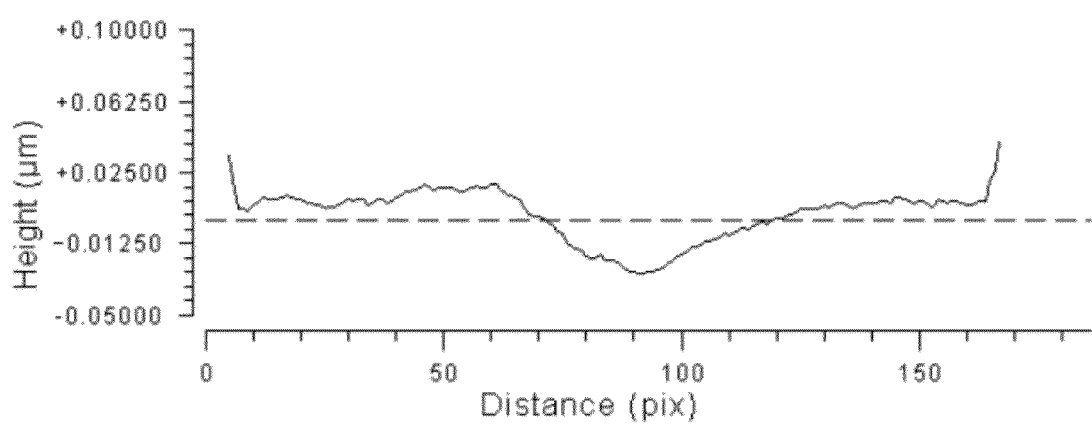

In this figure, as in FIGS. 2E, 3E and 4E, Distance represents the width (in pixels) of the measured zone, which is equal to approximately 40 mm; and Height represents a height variation (in µm).

FIG. 2B shows the result of the measurement of the front face of the substrate of FIG. 2A before machining the rear face of this substrate (first measurement); in the case of FIG. 2B, PV is equal to 0.083 µm and RMS is equal to 0.013 µm. FIG. 2C shows the result of the measurement of the front face of the substrate of FIG. 2A after machining the rear face of this substrate (second measurement); in the case of FIG. 2C, PV is equal to 0.229 µm and RMS is equal to 0.047 µm. FIG. 2D shows the modification of the front face, i.e. the first measurement (FIG. 2B) minus the second measurement (FIG. 2C); in the case of FIG. 2D, PV is equal to 0.211 µm and RMS is equal to 0.038 µm. FIG. 2E shows a profile of this modification.

FIG. 3B shows the result of the measurement of the front face of the substrate of FIG. 3A before machining the rear face of this substrate (first measurement); in the case of FIG. 3B, PV is equal to 0.089 µm and RMS is equal to 0.010 µm. FIG. 3C shows the result of the measurement of the front face of the substrate of FIG. 3A after machining the rear face of this substrate (second measurement); in the case of FIG. 3C, PV is equal to 0.169 µm and RMS is equal to 0.024 µm. FIG.

3D shows the modification of the front face, i.e. the first measurement (FIG. 3B) minus the second measurement (FIG. 3C); in the case of FIG. 3D, PV is equal to 0.145 µm and RMS is equal to 0.017 µm. FIG. 3E shows a profile of this modification.

FIG. 4B shows the result of the measurement of the front face of the substrate of FIG. 4A before machining the rear face of this substrate (first measurement); in the case of FIG. 4B, PV is equal to 0.102 µm and RMS is equal to 0.014 µm. FIG. 4C shows the result of the measurement of the front face of the substrate of FIG. 4A after machining the rear face of this substrate (second measurement); in the case of FIG. 4C, PV is equal to 0.141 µm and RMS is equal to 0.019 µm. FIG. 4D shows the modification of the front face, i.e. the first measurement (FIG. 4B) minus the second measurement (FIG. 4C); in the case of FIG. 4D, PV is equal to 0.110 µm and RMS is equal to 0.011 µm. FIG. 4E shows a profile of this modification.

For these four examples, it is observed that the surface of the front face has indeed been modified, in respective directions 6, 8 and 10, or in zone 12, which were machined by laser to demonstrate the validity of the invention. The caused deformations depend naturally on the material, its thickness and the machining undertaken.

Figure 5:
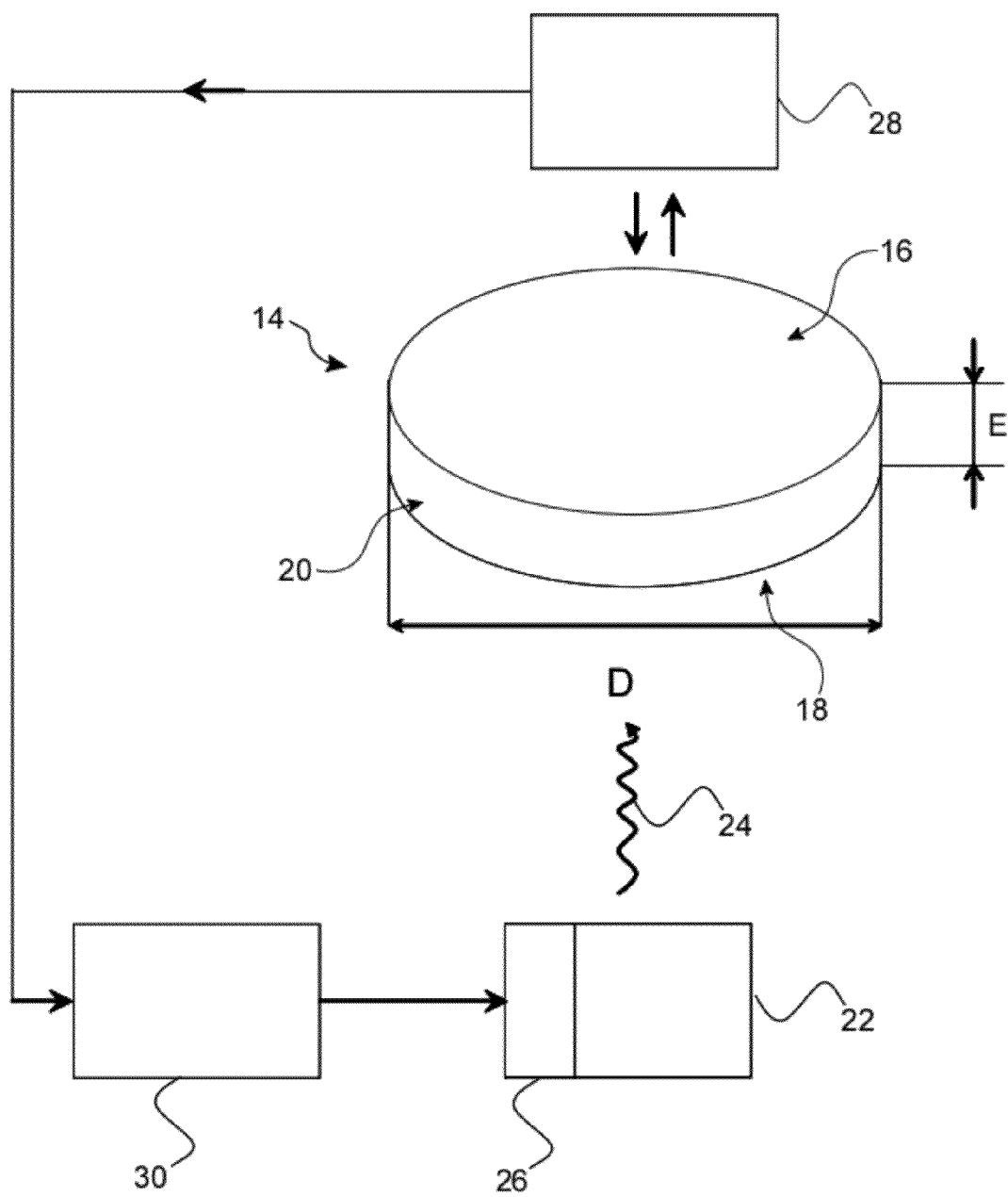
FIG. 5 illustrates schematically another example of the invention.

FIG. 5 illustrates another example of the invention.

In it a thin part 14 can be seen which is delimited by its front face 16, its rear face 18 and its periphery 20. The largest measurable distance in the front face is equal to at least eight times the distance between faces 16 and 18. The aspect ratio is therefore at least equal to 8:1.

In the example, part 14 is made of glass and has the shape of a cylinder of diameter D and of thickness E, where D≥8E.

The front face has a curvature defect.

To correct this defect in accordance with a particular embodiment of the invention, a laser 22 is used, for example a laser of the Nd:YAG type, which operates at 3 ω or 4 ω and which emits a radiation 24 with a wavelength of 355 nm (3 ω) or 266 nm (4 ω).

Laser 22 is fitted with displacement and orientation means 26. Using these means laser 22 is moved and its orientation modified to apply to rear face 18 of part 14, using radiation 24, the following treatment: either localised machining, or machining in a circle whose radius and depth of which depend on the deformation to be corrected and the properties of the material. Naturally, instead of moving laser 22 and orientate it to apply the treatment, it is possible to fit part 14 on displacement and orientation means, and to keep the laser fixed.

On the front face 16, the effect of this treatment is to eliminate or minimise the curvature.

Front face 16 is then inspected, for example using an interferometer 28 of the Fizeau or Michelson type, or a wavefront analyser of the Schack-Hartmann type, or a fringe projection system of the moiré type, to check that the defect has been corrected. If it has not been corrected, the treatment of rear face 18 is recommenced until the correction is accomplished.

The inspection may be made "in an open loop". In this case, laser 22 is operated independently of interferometer 28.

But it can also be made "in a closed loop". In this case, as is shown by FIG. 5, a signal provided by interferometer 28 is used, where this signal is representative of the microdeformation caused to front face 16 during the local treatment of rear face 18 by laser 22, to control this laser 22 and also the movements and orientation of the latter, through appropriate electronic control means 30. The local treatment of rear face 18 is recommenced, in this manner, until the defect of front face 16 is corrected.

It is stipulated that the present invention can be applied to thin parts such as telescope mirrors or optical microcomponents. The aspect ratio is in all cases of the order of 5:1 or greater than 5:1.

In addition, in the example given above, the part is made of glass. But the invention is not limited to the treatment of parts made from such a material. For example, it enables the front face of parts to be altered locally, through actions on the their rear faces, if these parts are made of amorphous materials of the glass, metals, ceramics or plastics type.

Nor is the invention limited to the use of a laser, the wavelength, power and rate of repetition of which can be modified to suit the material, in order to machine the rear face (or the periphery) of a thin part locally.

For example, it is possible to deform the front face of this part by using a laser to glaze locally the surface of the rear face (or the periphery) of the part.

In addition, the local treatment applied in accordance with the invention is not limited to laser machining in the invention it is possible to use chemical machining in order to machine the rear face (or the periphery) of the part locally, for example by using an ink jet machine.

This use may be a means in its own right (chemical etching by an acid, for example) or a means in addition to the laser machining, with a view to optimising the light-energy deposition through the deposition of inks or other substances, in order to optimise the absorption of the laser radiation by the rear face (or the periphery) of the part.

The invention may also be implemented by using an ion cannon, or a plasma jet, in order to machine the rear face (or the periphery) of the part locally.

The invention can also be implemented by using a local coating of the rear face (or of the periphery) of the part, where this coating consists of one or more thin layers.

The nature and the thickness of these layers and their locations are chosen in accordance with the amplitude of the correction to be made and with the position of the defect to be corrected. This deposition of thin layers may be undertaken by masking, using PVD or Sol-Gel techniques, or by ink jet.

In the invention, it is possible to use interferometers of the Fizeau or Michelson type, or wavefront analysers of the Schack-Hartmann type, or fringe projection systems of the moiré type, to assist the correction of the surface of the front face of the part. This system can be in an open loop or a closed loop with the chosen implementation device.

The invention therefore proposes the use of a static method to modify the surface state of the front face of a component, independently of the steps preceding production of the component.

This method can be used to compensate for the effect of the stresses caused by the presence of thin layers on the front face of the component. It is known, indeed, that such thin layers in general tend to make components convex.

This method can also be used to compensate for the edge effects relating to the steps of machining or cutting of a part.

In addition, it is stipulated that the present invention is not limited to the local treatment of the rear face of a thin part, with a view to causing a microdeformation of the front face of the part: to cause this microdeformation it is also possible to apply the local treatment to the periphery of the part.

Document WO 2004/036316 does indeed already teach a method of microdeformation of a thin optical element. According to this method, the rear face of the element is illuminated, which heats it and deforms it.

According to the method forming the object of the invention, the microdeformation accomplished is static, and frozen once and for all. The method disclosed by this document, for its part, belongs to a completely different category, that of dynamic correction methods. This is because, for heating, it uses laser diodes or lasers which deliver surface power densities of the order of 1 W·cm$^{-2}$, with the aim of not increasing the temperature by more than 20° C. This surface power density of the order of 1 W·cm$^{-2}$ is well below the power required for glazing or for a laser ablation, for example (of the order of 10$^3$ to 10$^9$ W·cm$^{-2}$). In addition, the invention is not limited to the application of a local treatment solely to the rear face of a part, nor to the use of a laser.

The invention claimed is:

1. A method for static microdeformation of a first face of a thin part, the thin part being delimited by the first face, by a second face opposite the first face, and by a peripheral portion which connects the first face to the second face, wherein the greatest measurable distance over the first face is greater than approximately five times the distance between the first and second faces, the method comprising applying a local treatment to the second face or to the peripheral portion, which causes a static microdeformation of the first face, wherein the static microdeformation does not change over time, without applying any mechanical force to the thin part,
   wherein the microdeformation is obtained by local machining of the second face or of the peripheral portion of the thin part, said local machining comprising local chemical machining.

2. A method according to claim 1, in which an inspection of the microdeformation of the first face is also made, to check whether a desired microdeformation has been obtained, and if this is not the case, the local treatment of the second face or of the peripheral portion is recommenced, until the desired microdeformation is obtained.

3. A method according to claim 2, in which a device is used which is capable of applying the local treatment to the second face or to the peripheral portion, the inspection is undertaken by means of a device for determining microdeformation, where this microdeformation determination device is capable of providing a representative signal of the microdeformation determined in this manner, and the device capable of applying the local treatment is controlled, by means of the signal, with a view to recommencing the local treatment until the desired microdeformation is obtained.

4. A method according to claim 1, wherein the greatest measurable distance is greater than eight times the distance between the first and second faces.

5. A method according to claim 1, wherein the chemical machining is undertaken using an ink jet machine.

6. A method for static microdeformation of a first face of a thin part, the thin part being delimited by the first face, by a second face opposite the first face, and by a peripheral portion which connects the first face to the second face, wherein the greatest measurable distance over the first face is greater than approximately five times the distance between the first and second faces, the method comprising applying a local treatment to the second face or to the peripheral portion, which causes a static microdeformation of the first face, wherein the static microdeformation does not change over time, without applying any mechanical force to the thin part,
   wherein the microdeformation is obtained by local machining of the second face or of the peripheral portion of the thin part,
   and wherein the local machining is undertaken by means of a laser, and in which, before the local machining, a substance capable of promoting absorption, by the second face or by the peripheral portion, of the radiation emitted by the laser, is deposited on the second face or on the peripheral portion of the thin part.

7. A method according to claim 6, in which an inspection of the microdeformation of the first face is also made, to check whether a desired microdeformation has been obtained, and if this is not the case, the local treatment of the second face or of the peripheral portion is recommenced, until the desired microdeformation is obtained.

8. A method according to claim 7, in which a device is used which is capable of applying the local treatment to the second face or to the peripheral portion, the inspection is undertaken by means of a device for determining microdeformation, where this microdeformation determination device is capable of providing a representative signal of the microdeformation determined in this manner, and the device capable of applying the local treatment is controlled, by means of the signal, with a view to recommencing the local treatment until the desired microdeformation is obtained.

9. A method according to claim 6, wherein the greatest measurable distance is greater than eight times the distance between the first and second faces.

* * * * *